(12) United States Patent
Kurka et al.

(10) Patent No.: US 12,337,280 B2
(45) Date of Patent: Jun. 24, 2025

(54) $NO_x$ ABATEMENT SYSTEM FOR A STATIONARY BURNING SYSTEM

(71) Applicant: YARA INTERNATIONAL ASA, Oslo (NO)

(72) Inventors: Wolfgang Kurka, Aalen (DE); Adi Zobl, Vienna (AT)

(73) Assignee: YARA INTERNATIONAL ASA, Oslo (NO)

( * ) Notice: Subject to any disclaimer, the term of this patent is extended or adjusted under 35 U.S.C. 154(b) by 1108 days.

(21) Appl. No.: 17/273,446

(22) PCT Filed: Sep. 18, 2019

(86) PCT No.: PCT/EP2019/074930
§ 371 (c)(1),
(2) Date: Mar. 4, 2021

(87) PCT Pub. No.: WO2020/058299
PCT Pub. Date: Mar. 26, 2020

(65) Prior Publication Data
US 2021/0187440 A1    Jun. 24, 2021

(30) Foreign Application Priority Data
Sep. 18, 2018    (EP) ...................................... 18195169

(51) Int. Cl.
*B01D 53/86*    (2006.01)
*B01D 47/06*    (2006.01)
(Continued)

(52) U.S. Cl.
CPC ......... *B01D 53/8631* (2013.01); *B01D 47/06* (2013.01); *B01F 23/2132* (2022.01);
(Continued)

(58) Field of Classification Search
None
See application file for complete search history.

(56) References Cited

U.S. PATENT DOCUMENTS 6,449,947 B1 * 9/2002 Liu ..................... B01F 25/4521
60/324
6,737,032 B1    5/2004 Aspalter et al.
(Continued)

FOREIGN PATENT DOCUMENTS

DE    3615705 A1 * 11/1987
EP    2623181 A1    8/2013
(Continued)

OTHER PUBLICATIONS

DE3615705A1—translated document (Year: 1987).*
(Continued)

*Primary Examiner* — Jelitza M Perez
(74) *Attorney, Agent, or Firm* — Dilworth IP, LLC

(57) ABSTRACT

The present application relates to abatement processes and systems of nitrogen oxide ($NO_x$) contained in exhaust gases, more in particular produced by stationary burner and combustion systems. The $NO_x$ are removed by reduction using a catalyst and a reducing agent that is introduced into the exhaust gases and being mixed therewith. The mixture is then conducted over the catalyst resulting in conversion of the $NO_x$ in environmentally neutral $N_2$ and $H_2O$. The present application more in particular relates to a mixing system for such a $NO_x$ abatement system to mix the exhaust gases with the reducing agent.

20 Claims, 4 Drawing Sheets

(51) Int. Cl.
  *B01F 23/213* (2022.01)
  *B01F 25/313* (2022.01)
  *F23J 15/00* (2006.01)
  *B01F 25/00* (2022.01)

(52) U.S. Cl.
  CPC .. *B01F 25/31322* (2022.01); *B01F 25/31331* (2022.01); *F23J 15/003* (2013.01); *B01D 2251/2062* (2013.01); *B01D 2251/2067* (2013.01); *B01D 2258/0283* (2013.01); *B01F 2025/931* (2022.01); *F23J 2215/10* (2013.01)

(56) References Cited

U.S. PATENT DOCUMENTS

| | | | |
|---|---|---|---|
| 8,017,084 | B1 | 9/2011 | Wirt et al. |
| 9,387,448 | B2 | 7/2016 | Ivanova et al. |
| 9,482,132 | B2 * | 11/2016 | Munnannur .......... F01N 3/2066 |
| 2013/0213511 | A1 | 8/2013 | Yukimura et al. |
| 2014/0134085 | A1 * | 5/2014 | Ivanova ............ B01F 25/31331 366/337 |
| 2015/0041014 | A1 * | 2/2015 | Ferguson .......... B01D 53/9418 137/896 |
| 2019/0030498 | A1 * | 1/2019 | Kariya ................ B01F 25/4521 |

FOREIGN PATENT DOCUMENTS

| | | | |
|---|---|---|---|
| WO | 2005021144 A1 | 3/2005 | |
| WO | WO-2017169521 A1 * | 10/2017 | ......... B01D 53/9431 |

OTHER PUBLICATIONS

Lothar, S. DE3615705A1—translated document (Year: 1987).*
International Search Report and Written Opinion for PCT/EP2019/074930; dated Nov. 5, 2019, 14 pages.
European Search Report for EP18195169.0, dated Jan. 11, 2019, 10 pages.

* cited by examiner

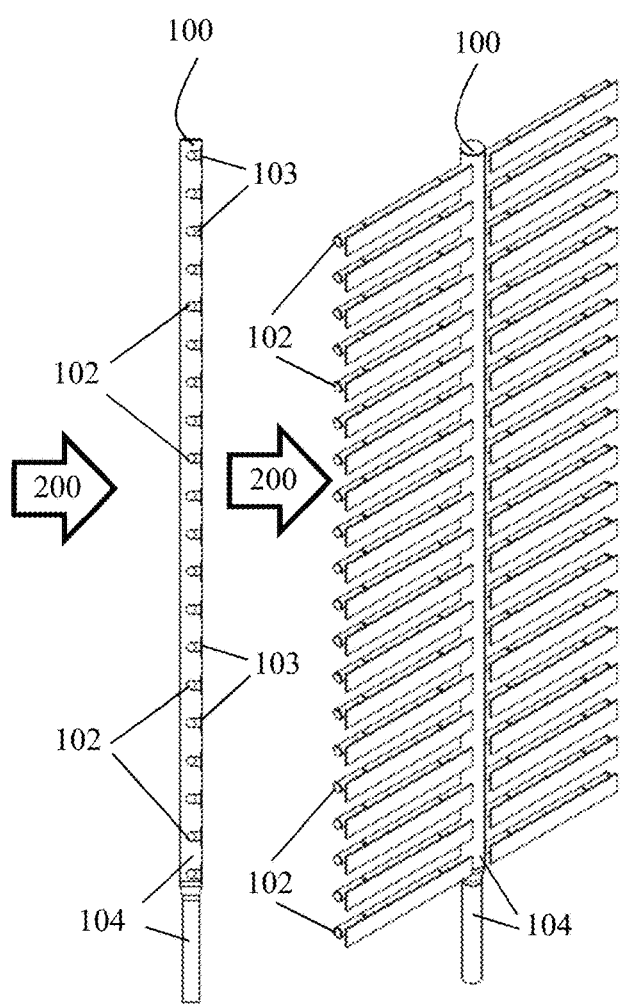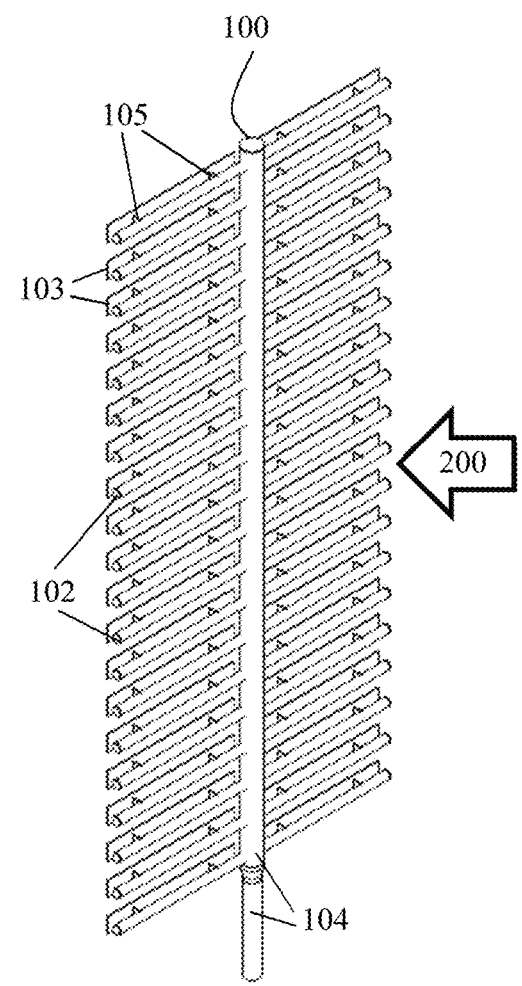
FIG. 2a   FIG. 2b   FIG. 2c

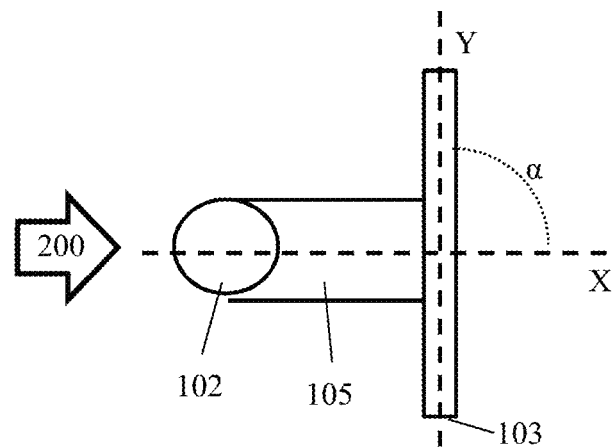
FIG. 4
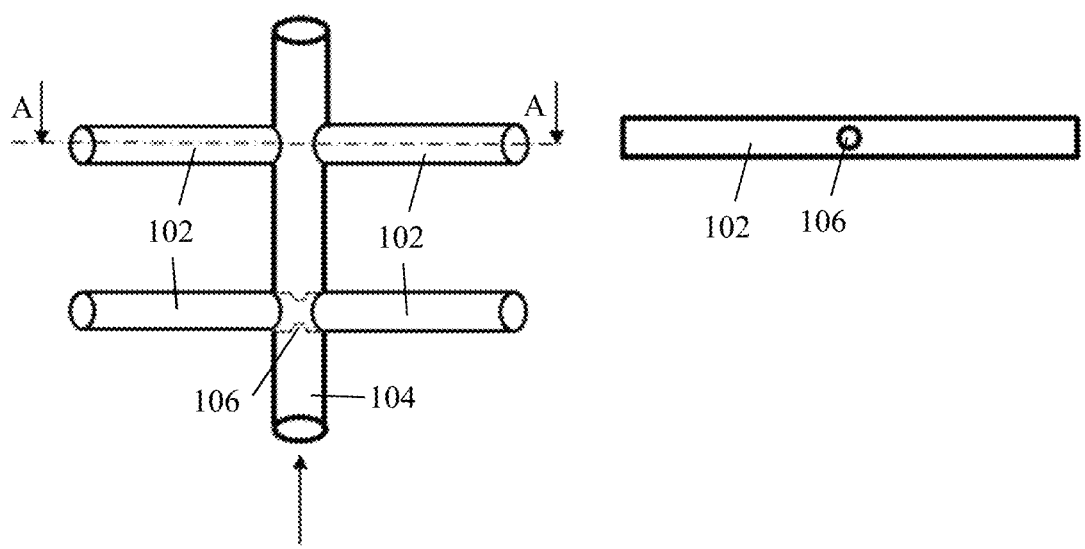
FIG. 5a  FIG. 5b

$NO_x$ ABATEMENT SYSTEM FOR A STATIONARY BURNING SYSTEM

TECHNICAL FIELD

The present application relates to abatement processes and systems of nitrogen oxide ($NO_x$) contained in exhaust gases, more in particular produced by stationary burner and combustion systems. The $NO_x$ are removed by reduction using a catalyst and a reducing agent that is introduced into the exhaust gases and being mixed therewith. The mixture is then conducted over the catalyst resulting in conversion of the NOx in environmentally neutral $N_2$ and $H_2O$. The present application more in particular relates to a mixing system for such a $NO_x$ abatement system to mix the exhaust gases with the reducing agent.

BACKGROUND

Stationary burning and/or combustion systems are located in all sectors of the economy and include power generators, stationary engines, boilers, heaters, engines, furnaces, kilns, ovens, flares, incinerators, dryers, gas turbines, chemical reformers and any other equipment or machinery that burns fuel. These systems and methods typically comprise equipment that converts the chemical energy in solid, liquid, or gaseous fuels to high temperature heat energy by oxidation. During stationary combustion, fossil fuels or waste fuels such as coal, oil, natural gas, refinery gas, municipal waste and biomass are burned to produce high temperature heat for use in electricity generation, industrial sources and space heating. Combustion can also be used to incinerate waste in order to reduce the volume of it or to destroy chemical compounds.

The major air pollutants emanating from such stationary systems are nitrogen oxides ($NO_x$), including nitric oxide (NO), nitrogen dioxide ($NO_2$) and nitrous oxide ($N_2O$). The total NO and $NO_2$-concentration is typically referred to as $NO_x$ (nitrogen oxides). Nitrogen oxides are mainly produced in the form of NO. Some $NO_2$ and $N_2O$ are also formed, but with lower concentrations. These air pollutants are the subject of growing concern because these compounds are considered toxic and are the precursors to acid rain deposition as well as photochemical smog. Furthermore, nitrous oxide contributes to the greenhouse effect.

Emission regulations for nitrogen oxides are becoming more stringent throughout the world. In stationary systems, it is known to reduce these nitrogen oxides by using a catalyst in the exhaust gas flow channel. A reducing agent such as ammonia is introduced into the exhaust gases and mixed with the exhaust gases. The resulting mixture is then conducted over the catalyst, as a result of which the nitrogen oxides are converted into harmless diatomic nitrogen ($N_2$) and water ($H_2O$).

The effectiveness of this process is strongly dependent, on the one hand, on the degree of mixing of the ammonia and the nitrogen oxide molecules, and on the other hand, on their uniform distribution throughout the flow of the exhaust gases. In order to respond to the requirements of mixing with and distributing a reducing agent in the exhaust gases different types of mixing have already been suggested.

In U.S. Pat. No. 6,737,032, for instance, a device and a process are described for introducing reducing agents into exhaust gases produced by a stationary system burning or combusting fossil fuels or incinerating waste and comprising an exhaust gas flow channel for transporting the exhaust gas containing amongst others nitrogen oxides. The device comprises nozzle apertures which are located in the exhaust gas flow channel and are intended for the introduction of reducing agent into the exhaust gases. The device further comprises a catalyst which is located downstream in the flow direction of the exhaust gas and the reducing agent and as a result of which reduction of $NO_x$ contained in the exhaust gases is brought about between the exhaust gas and the reducing agent. To induce turbulence in the exhaust gases containing NOx in the regions where reducing agent is introduced, the device comprises transversely projecting deflectors that are fastened to tubular pieces, upstream of the nozzle apertures in view of the flow direction. As a result, the required intensive mixing of the exhaust gases with the reducing agent is brought about directly in the regions where the reducing agent is introduced into the exhaust gases.

The disadvantage of this system is that the transversely projecting deflectors are positioned upstream from the injection point of the reducing agent in view of the flow direction. Deflectors positioned downstream of the injection points (in view of the flow direction of the exhaust gas) result in a better homogenization of the flow pattern of the injected reducing agent as well as the flue gas flow pattern induced by the injectors itself. The disadvantage of this system however is that, due to the complexity of these types of injection and mixing elements, the mixing system is highly complex and comprises a large number of different parts, thereby increasing both the production and maintenance cost. Also the numerous parts of the system render the system prone to faults and breakages, thereby reducing the efficiency of the mixing.

In WO 2005/021144, a mixing system is disclosed comprising a number of mixing elements that are arranged in a flow channel downstream from the injection location of the reaction medium. In order to obtain good mixing a mixing element is provided for each injection point and each mixing element comprises multiple mixing vanes disposed around the center axis of the mixing element.

The disadvantage of this system however is that, due to the complexity of these types of injection and mixing elements, the mixing system is highly complex and comprises a large number of different parts, thereby increasing both the production and maintenance cost. Also the numerous parts of the systems render the system prone to faults and breakages, thereby reducing the efficiency of the mixing.

It is accordingly an object of the present application to provide in a mixing system for a $NO_x$ abatement system which has deflectors arranged downstream the injection points for the $NO_x$ reducing gas in view of the flow direction of the exhaust gases, that is less complex than the known systems but has a mixing which is as intensive as and has a pressure drop as low as the known systems.

SUMMARY

According to a first aspect of the present application, a mixing system for a $NO_x$ abatement system is disclosed, comprising a flow passage for conducting an exhaust gas stream comprising $NO_x$ in an exhaust gas stream flow direction, one or more injection lances positioned inside the flow passage and provided with one or more injection points for introducing a NOx reducing agent into the exhaust gas stream, and flat deflector plates operatively associated with the injection lances and positioned inside the flow passage downstream from the one or more injection points and in a transverse direction on the exhaust gas flow direction for mixing the NOx reducing agent with the exhaust gas stream by inducing turbulent flows.

As used herein, the term "flow passage" relates to the path through which the exhaust gas stream comprising $NO_x$ is guided. This flow passage can have any form known in the art and is designed in order to minimize pressure drop of the exhaust gas flow. Also, as used herein, the flow direction of the exhaust gas stream through the flow passage, mixing system, $NO_x$ abatement system or stationary burning and/or combustion system refers to the direction in which the exhaust gas stream flows, namely from the burning/combustor where the exhaust gas is generated or the inlet of the exhaust gas and toward the outlet of the exhaust gas.

As used herein the term "injection lance" refers to an apparatus which enables the injection of a NOx reducing agent into the exhaust gas stream.

As used herein, the term "$NO_x$ reducing agent" refers to a reductant composition which comprises chemical compounds for the reduction of nitrogen oxides. In particular the "NOx reducing agent" is a composition comprising ammonia, ammonia salts or ammonia precursors such as urea, ammonium carbamate or guanidinium salts.

As used herein the term "deflector" refers to a flat preferably, but not limited to rectangular, fin structure that is used to create turbulence in the flow passage. This is realized by positioning a deflector in close proximity to and downstream from an injection lance thereby ensuring that the deflector is operatively associated with the injection lance. Furthermore, the deflector is positioned and/or projecting transverse with regard to the exhaust gas stream flow direction.

As used herein the term "downstream" refers to the position of the deflector with respect to the injection lance, and indicates that the exhaust gas stream reaches the injection lance first and is consecutively contacted with the deflector.

As used herein the term "transverse" refers to the direction in which the deflector is positioned vis-à-vis the exhaust gas stream flow direction. In particular, the deflector is positioned in the flow channel transversely to the given flow direction of the exhaust gas stream in the flow channel. Due to the fact that the deflector plates are aligned transversely with respect to the flow of the exhaust gases, they respectively give rise, on their side away from the flow direction, to a region in which a reduced pressure is produced. As a result, strong turbulence of the exhaust gases is induced in the region following the region where the NOx reducing agent is injected into the exhaust gas flow. This leads to intensive mixing of the exhaust gases with the reducing agent, thereby optimally mixing the exhaust gases with the NOx reducing agent.

The deflector plates furthermore have a flat and straight structure. While deflectors disclosed in the prior art have a typical curved and arched surface, it has now been found that the use of flat and straight deflector plates provide excellent mixing properties while maintaining minimal pressure drop. Also flat and straight deflector plates are very simple in structure and can be easily and cheaper manufactured and can be easily installed as they do not require any custom made fixation means. They can also easily be attached to or positioned near the $NO_x$ reduction agent injection lances, thereby providing a light-weight, cost-efficient and easily replaceable mixing system.

The deflector plates more specifically are operatively associated with each of the injection lances.

In a possible embodiment of a mixing system according to the present application, the mixing system comprises an injection grid comprising a multitude of parallel injection lances for introducing the $NO_x$ reducing agent into the exhaust gas stream, and projecting in a plane perpendicular to the exhaust gas stream flow direction along a central $NO_x$ reducing agent feed pipe, wherein to each injection lance a flat deflector plate is connected.

In a more particular embodiment, each of the injection lances of the injection grid penetrate through the central feed pipe, and each of the injection lances is provided with a hole where the injection lance crosses the feed pipe, through which hole the $NO_x$ reducing agent can flow.

This has the advantage that, at each injection point, there is a very homogeneous flow distribution of the $NO_x$ reducing agent in the exhaust gas flow channel.

The deflector plates are connected to the injection lances using one or more spacers. Advantageously, connecting the flat deflector plate to the injection lance via a spacer allows to influence the flow pattern and the mixing of the $NO_x$ reducing agent and the exhaust gas stream. In particular, the use of a spacer ensures a high degree of mixing of the $NO_x$ reducing agent with the $NO_x$ containing exhaust gas stream and a uniform distribution of the $NO_x$ reducing agent throughout the flow of the exhaust gases, by providing local turbulence both near the injection point (i.e. between injection lance or injection point and the deflector) as well as immediately downstream of the deflector plate (in the wake of the deflector plate). In particular, a so-called "shadow effect" of the deflector plate (i.e. a zone immediately downstream of the deflector plate wherein the NQ reducing agent is not evenly mixed with the exhaust gas stream) can be minimized. Without a spacer, the deflector plate may divert the flow too strongly to the side, so that the wake-side of the deflector plate is not fully covered, which may result in uneven concentrations of the injected $NO_x$ reducing agent.

This provides in a direct attachment of the deflector plates to the injection lances. Such direct attachment is considered more economical from a manufacturing perspective as well as for maintenance and reparation perspectives. Connecting the flat deflector plate to the injection lance via a spacer allows a better inspection and maintenance of the injection lance and injection points, as they are better accessible. Combining the injection lances and the deflectors in a single structure also reduces the weight of the structure and reduces the space which is taken by the structure, thereby rendering the structure more economical.

In a possible embodiment of a mixing system according to the present application, the one or more injection lances are provided with a multiplicity of openings each serving as an injection point and each being individually supplied with $NO_x$ reducing agent, and being arranged to inject evaporated $NO_x$ reducing agent, either directly, either carried by a carrier gas stream, into the exhaust gas flow channel.

As used herein the carrier gas stream refers to a gaseous composition which is injected into the exhaust gas flow together with evaporated liquid NOx reducing agent. The carrier gas is in particular chosen from air, exhaust gas or other known carrier gases.

In a possible embodiment of a mixing system according to the present application, the mixing system can further comprise a heating system to either evaporate liquid $NO_x$ reducing agent or heat the carrier gas stream if it is too cold to evaporate liquid $NO_x$ reducing agent.

The heating system can possibly be an electrical heating system, a steam heating system, a hot water heating system, a heat transfer fluid heating system or a spray evaporator.

In a possible embodiment of a mixing system according to the present application, the openings in the injection lances are nozzle apertures.

In a particular embodiment of a mixing system according to the present application, the deflector plates are made out of carbon or stainless steel.

By using materials such as carbon or stainless steel the deflectors are made from durable materials avoiding any prone to faults or breakages in the mixing system, thereby also requiring only a minimal amount of maintenance.

In an embodiment of a mixing system according to the present application, the mixing system comprises between 5 and 60 injection points per square meter. The number of injection points is therewith dependent from the mixing distance and the $NO_x$ reduction rate.

In an optional embodiment of a mixing system according to the present application, the flow passage for the exhaust gas stream has a cross-section of 10 to 400 m$^2$, typically 20 to 300 m$^2$, and the flow velocity is between 1 m/s and 30 m/s, typically between 4 m/s and 12 m/s.

According to a further aspect of the present application, a method is provided for introducing a $NO_x$ reducing agent into and mixing the $NO_x$ reducing agent with an exhaust gas stream comprising $NO_x$, the method comprising the steps of conducting the exhaust gas stream comprising $NO_x$ through a flow channel, introducing the $NO_x$ reducing agent, through one or more injection lances comprising injection points, into the exhaust gas stream comprising $NO_x$, and mixing the $NO_x$ reducing agent with the exhaust gas stream comprising $NO_x$ by inducing turbulent flow with flat deflector plates operatively associated with the injection lances and positioned downstream from the injection points and transverse to the direction of the exhaust gas stream flow direction. It is understood that the angle wherein the $NO_x$ reducing agent is introduced into the exhaust gas flow is not critical and can be between 0° and 90° related to the main flow direction of the exhaust gas flow. In certain embodiments the $NO_x$ reducing agent is introduced into the exhaust gas flow at an angle of between 0° and 60°, such as between 0° and 45°.

The $NO_x$ reducing agent can be chosen from a liquefied anhydrous ammonia ($NH_3$), an aqueous ammonia solution, an aqueous urea ($CO(NH_2)_2$) solution or liquefied solid urea. The solid urea is then first diluted in water and then used as aqueous urea solution. Solid urea as such can be used in case of very high temperatures.

According to a still further aspect of the present application, the present application relates to the use of a mixing system according to the present application as disclosed above in a $NO_x$ abatement system for a stationary burning system.

DESCRIPTION OF FIGURES

The following description of the figures of specific embodiments is only given by way of example and is not intended to limit the present explanation, its application or use. In the drawings, identical reference numerals refer to the same or similar parts and features.

FIG. 2 shows an embodiment of an injection element of a mixing system according to the present application;

FIG. 4 shows a detailed view of the position of an injection lance vis-a-vis a deflector plate of a mixing system as shown in FIGS. 1 and 2.

FIG. 5a shows a front view of an injection lances penetrating through the NOx reducing agent feed pipe of a mixing system as shown in FIGS. 1 and 2.

FIG. 5b shows the cross-section A-A as shown in FIG. 5a.

Figure 1:
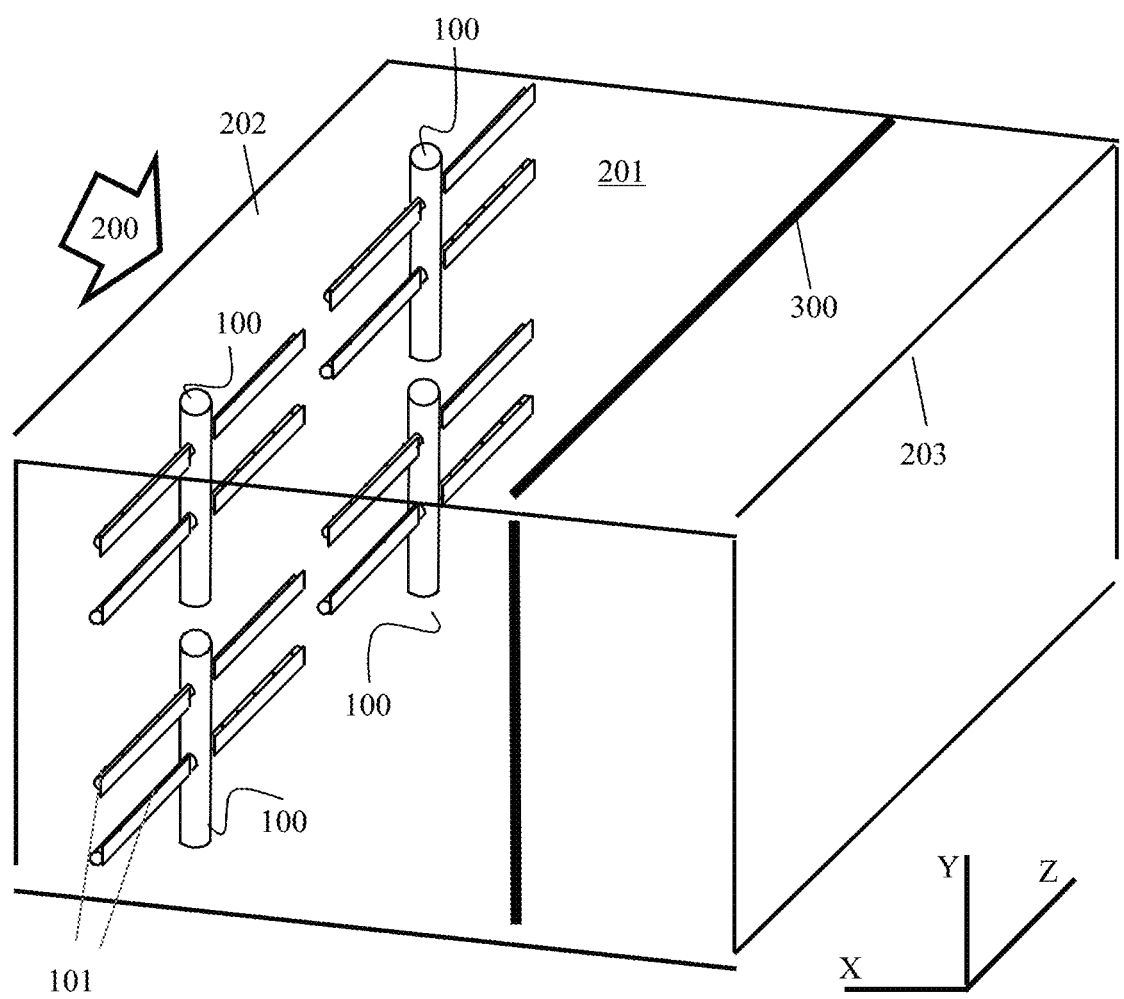
FIG. 1 shows an embodiment of a mixing system according to the present application.

The following reference numerals are used in the description and figures: 100—mixing system; 101—injection point; 102—injection lance; 103—deflector plate; 104—central $NO_x$ reducing agent feed pipe; 105—spacer; 106—hole in each of the injection lances; 200—exhaust gas stream flow direction; 201—flow channel; 202—exhaust gas inlet; 202—exhaust gas outlet; 300—catalyst, X—axis parallel to the exhaust gas stream flow direction; Y—axis parallel to the frontal surface of the deflector plate (along the width of the deflector plate); Z—axis parallel to the frontal surface of the deflector plate (along the length of the deflector plate); α—angle between X-axis and Y-axis.

DETAILED DESCRIPTION

A mixing system (100) for a nitrogen oxide ($NO_x$) abatement system as shown in FIG. 1, comprises a flow passage for conducting an exhaust gas stream comprising $NO_x$ in an exhaust gas stream flow direction (200). This flow passage (201) for the exhaust gas stream has an exhaust gas inlet (202) and an exhaust gas outlet (203). It furthermore typically has a cross-section of 10 to 400 m$^2$, more specifically 20 to 300 m$^2$. The flow velocity of the exhaust gas through the flow channel is more in particular smaller than 30 m/s.

Inside the flow passage, one or more injection lances (102) are positioned that are provided with one or more injection points for introducing a $NO_x$ reducing agent into the exhaust gas stream. The $NO_x$ reducing agent can be a liquefied anhydrous ammonia ($NH_3$), an aqueous ammonia solution, an aqueous urea ($CO(NH_2)_2$) solution or solid urea.

Flat deflector plates (103) are operatively associated with the injection lances (102) and positioned inside the flow passage for mixing the $NO_x$ reducing agent with the exhaust gas stream by inducing turbulent flows. More in particular, each of the injection lances (102) has a respective flat deflector plate (103) that operatively is associated with it. These deflector plates (103) are positioned downstream from the one or more injection lances (102), in particular downstream from the injection points (101), and in a transverse direction on the exhaust gas stream flow direction (200).

Each of the injection lances (102) may comprise one or more injection locations through which the $NO_x$ reducing agent is injected into the exhaust gas stream. Each of the multiplicity of openings is more in particular individually supplied with $NO_x$ reducing agent.

The injection points (101) may be any type of injection point known in the art such as simple openings or holes. The injections lances (102) may be a perforated tube, or the injection location may also comprise a more complex structure such as an injection nozzle or a nozzle aperture, for instance as terminating piece of the injection lance (102). The nozzle may atomize the $NO_x$ reducing agent such that it is supplied and distributed quickly and homogeneously in the exhaust gas. The injection lances (102) may comprise gas-liquid injectors such as atomizers, in particular dual-fluid atomizers that use air or steam as the atomizing medium, as well as suitably designed pressure atomizers.

The mixing system (100) may have between 5 and 60 injection points per square meter.

The deflector plates (103) may have a cuboid or rectangular prism shape. The rectangular prism shape is the most simple one. When the deflector plates (103) have a cuboid shape, the surface of the deflector plates (103) facing the exhaust gas stream flow have a surface area which is larger compared to the adjacent side surfaces of the cuboid shape. In particular, the spacer/deflector plate combination is T-shaped, as shown in FIG. 4. This shape provides a higher strength to the deflector, resulting in less risk of vibrations in the structure.

The deflector plates (103) can be made out of carbon or stainless steel.

The $NO_x$ reducing agent can be injected into the exhaust gas flow channel (201) as a liquid or as a vapor. In case the $NO_x$ reducing agent is injected as a liquid, the temperature of the exhaust gas must be sufficient high to evaporate the $NO_x$ reducing agent.

In case the $NO_x$ reducing agent is injected as a vapor, this can be done by directly injecting evaporated reducing agent into the exhaust gas flow channel (201), or via a carrier gas stream.

A heating system (not shown on the Figures), which is more in particular positioned outside the exhaust gas flow channel (201), can be arranged to evaporate liquid $NO_x$ reducing agent itself, or to heat the carrier gas when it is too cold to evaporate liquid $NO_x$ reducing agent and to carry this evaporated $NO_x$ reducing agent towards the mixing system (100).

As can be seen in FIG. 1, in the exhaust gas flow channel (100), different mixing systems (100) as shown in in FIGS. 2a to 2c can be arranged next to and/or above each other. The evaporated NOx reducing agent, with or without carrier gas, is then distributed to the different mixing systems (100) by means of adjustment dampers (not shown on the Figures). More in particular, during commissioning, these dampers are adjusted manually. This is more in particular used in case the $NO_x$ distribution in the exhaust gas stream is very inhomogeneous. The manual adjustment of the dampers during commissioning targets a good NOx outlet distribution of the catalyst, and taking care of a compensation of the geometrical deviation of the systems. Each of the different mixing systems (100) gets then a part of the $NO_x$ reducing agent vapour, with or without the carrier gas, and mixes it into the exhaust gas stream by using the injection lances (102) and the deflector plates (103). The central feed pipe (104) is connected to the adjustment dampers. After typically 1 meter to 20 meter, the mixture of exhaust gas and reducing agent vapour enters the catalyst (300), where finally the nitrogen oxides are reduced to nitrogen and water.

The carrier gas can be recycled exhaust gas or air. If recycled exhaust gas is used as carrier gas, this gas is extracted from the exhaust gas stream by means of fans/blowers (not shown on the Figures).

As can be seen in FIGS. 2a and 2b, the multitude of injection lances (102) that are positioned in parallel to each other and that are connected to the feed pipe (104) form a grid like structure.

As can be seen in FIGS. 5a and 5b, each of the injection lances (102) penetrate through the feed pipe (104). In order to enable $NO_x$ reducing agent to still flow through the feed pipe (104), each injection lance (102) is provided with a hole (106) where the injection lance (102) crosses the feed pipe (104).

While the deflector plates (103) could be connected to a structure that is positioned in parallel with the injection grid, the direct connection of the deflector plates (103) onto the injection lances (102) is considered more economical from a manufacturing perspective as well as for maintenance and reparation perspectives. The direct attachment of the deflector plates onto the injection lances can be made using spacers (105) (see FIG. 4). Combining the injection lances and the deflectors in a single structure also reduces the weight of the structure and reduces the space which is taken by the structure, thereby rendering the structure more economical. The direct connection between the deflector plates (103) and the injection lances (102), in particular via spacers (105), can be a fixed connection, such as via a welded connection, but can as well be a releasable connection through which the deflector plates (103) can be removed from the injection lances (102), for instance for maintenance reasons. The use of welds to attach the deflector plates (103) onto the injection lances (102) provides in a robust attachment that ensures the durability of the mixing system.

Figure 3:
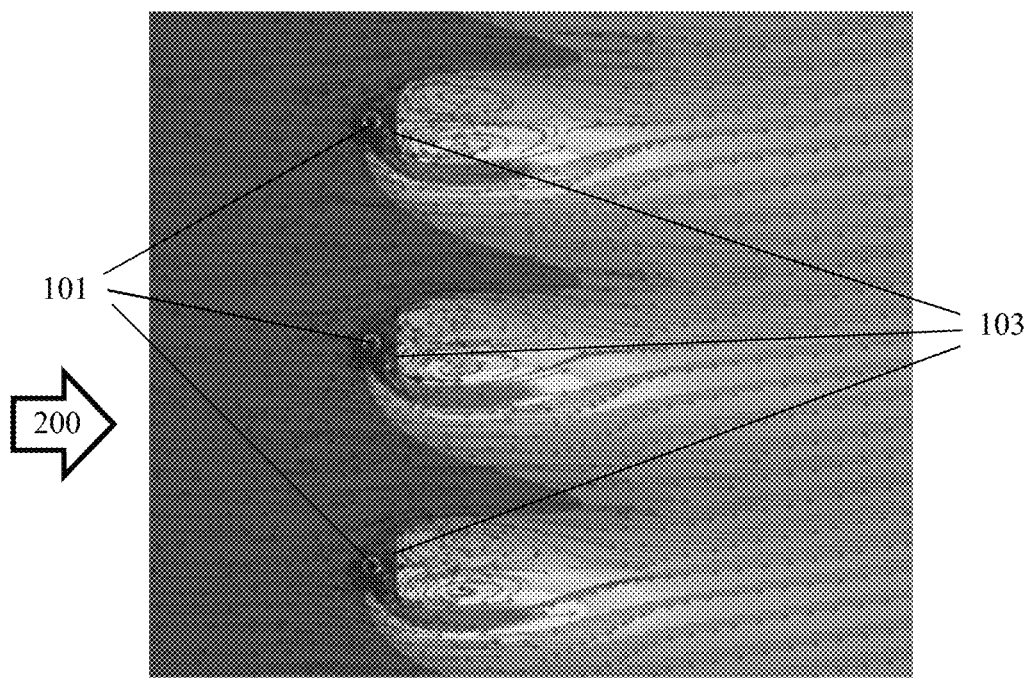
FIG. 3 shows a Computer Fluid Dynamics (CFD) representation of the turbulent flow profiles of an embodiment of a mixing system according to the present application.

As can be deducted from the CFD as shown in FIG. 3, the specific position of the deflector plates (103) downstream from and in near vicinity of the injection locations (101) of the $NO_x$ reducing agent results in local turbulence near the injection locations sufficient for a good mixing of the $NO_x$ reducing agent with the exhaust gas stream. The zone after the deflector plates (103) until the entrance of the catalyst (300) (see FIG. 1), is arranged such as to provide both the necessary turbulence, and after that, a defined flow pattern at the inlet of the catalyst to ensure low pressure drop and good reduction performance of the catalyst.

As can be seen on FIGS. 1 and 4, the exhaust gas stream flows through the flow channel (201) along an axis X and the surface of the deflector plates (103) facing the exhaust gas stream flow is positioned in a plane defined by axes Y and Z. The angle α between axes X and Y is typically ranged between 30° and 150°, more in particular between 45° and 135°, more in particular between 60° and 120°, more in particular between 75° and 105°, more in particular between 80° and 100°, more in particular between 85° and 95°, and more in particular at an angle of about 90°. More in particular the plane of the face of the deflector plates (103) with the largest surface area stands perpendicular to the flow direction of the exhaust gas stream in the flow channel.

A method according to the present application for introducing a nitrogen oxide ($NO_x$) reducing agent into and mixing the $NO_x$ reducing agent with an exhaust gas stream comprising $NO_x$ comprises the steps of:
- conducting the exhaust gas stream comprising $NO_x$ through a flow channel;
- introducing the $NO_x$ reducing agent, through one or more injection lances, into the exhaust gas stream comprising $NO_x$;
- mixing the $NO_x$ reducing agent with the exhaust gas stream comprising $NO_x$ by inducing turbulent flows with flat deflector plates operatively associated with the injection lances and positioned downstream from the injection lances and transverse to the direction of the exhaust gas stream flow direction.

The mixing system (100) as described above can be used in a $NO_x$ abatement system for a stationary burning system.

A stationary burning system more in particular comprises an abatement system for reducing nitrogen oxides ($NO_x$) in exhaust gases produced by the stationary burning system comprising an exhaust gas flow channel for conducting the exhaust gases comprising $NO_x$ in a given flow direction in the exhaust gas flow channel and a $NO_x$ abatement system comprising a mixing system (100) as described above and a catalytic converter disposed downstream from the mixing system (100).

The invention claimed is:

1. A mixing system for a nitrogen oxide ($NO_x$) abatement system, which comprises:
   a flow passage for conducting a $NO_x$ comprising exhaust gas stream in an exhaust gas stream flow direction;
   at least one injection lance positioned inside the flow passage and arranged with at least one injection point for introducing a $NO_x$ reducing agent into the exhaust gas stream; and
   flat deflector plates operatively associated with the at least one injection lance and positioned inside the flow passage downstream from the at least one injection point and in a transverse direction on the exhaust gas flow direction for mixing the $NO_x$ reducing agent with the exhaust gas stream by inducing turbulent flows, wherein the flat deflector plates are connected by means of at least one spacer to the at least one injection lance, wherein the at least one spacer extends in the exhaust gas flow direction from a first end attached to the at least one injection lance to a second end attached to at least one of the flat deflector plates.

2. The mixing system according to claim 1, wherein the flat deflector plates are operatively associated with each of the injection lances.

3. The mixing system according to claim 1, wherein the mixing system further comprises an injection grid comprising a multitude of parallel injection lances for introducing the $NO_x$ reducing agent into the exhaust gas stream, and projecting in a plane perpendicular to the exhaust gas stream flow direction along a central $NO_x$ reducing agent feed pipe, wherein to each injection lance a flat deflector plate is connected by means of the at least one spacer.

4. The mixing system according to claim 3, wherein each of the injection lances of the injection grid penetrate through the central $NO_x$ reducing agent feed pipe, and each of the injection lances is provided with a hole where the injection lance crosses the feed pipe, through which hole the $NO_x$ reducing agent can flow.

5. The mixing system according to claim 1, wherein the at least one injection lance is provided with a multiplicity of openings, each serving as an injection point and each being individually supplied with $NO_x$ reducing agent and being arranged to inject evaporated $NO_x$ reducing agent, either directly, or carried by a carrier gas stream, into the exhaust gas stream.

6. The mixing system according to claim 5, wherein the carrier gas stream is recycled flue gas or air.

7. The mixing system according to claim 6, wherein the mixing system further comprises a heating system to
   evaporate liquid $NO_x$ reducing agent; or
   heat the carrier gas stream if it is too cold to evaporate liquid $NO_x$ reducing agent.

8. The mixing system according to claim 5, wherein the openings are nozzle apertures.

9. The mixing system according to claim 1, wherein the deflectors are made out of carbon or stainless steel.

10. The mixing system according to claim 1 comprising between 5 and 60 injection points per square meter.

11. The mixing system according to claim 1, wherein the flow passage for the exhaust gas stream has a cross-section of 10 to 400 m² and a flow velocity between 1 m/s and 30 m/s.

12. A method for introducing a nitrogen oxide ($NO_x$) reducing agent into and mixing the $NO_x$ reducing agent with an exhaust gas stream comprising $NO_x$, the method comprising:
   conducting the exhaust gas stream comprising $NO_x$ through a flow channel;
   introducing the $NO_x$ reducing agent, through at least one injection lance, into the exhaust gas stream comprising $NO_x$, wherein said at least one injection lance is arranged with at least one injection point for introducing the $NO_x$ reducing agent into the exhaust gas stream;
   mixing the $NO_x$ reducing agent with the exhaust gas stream comprising $NO_x$ by inducing turbulent flows with flat deflector plates operatively associated with the injection lances and positioned downstream from the injection points and transverse to the a direction of flow of the exhaust gas stream flow direction, wherein the flat deflector plates are connected by means of at least one spacer to at least one injection lance, wherein the at least one spacer extends in the direction of flow of the exhaust gas stream from a first end attached to the at least one injection lance to a second end attached to at least one of the flat deflector plates.

13. The method according to claim 12, wherein the $NO_x$ reducing agent is chosen from liquefied anhydrous ammonia ($NH_3$), an aqueous ammonia solution, an aqueous urea ($CO(NH_2)_2$) solution or solid urea.

14. A stationary burning system comprising an $NO_x$ abatement system for reducing nitrogen oxides ($NO_x$) in exhaust gases produced by the stationary burning system, comprising an exhaust gas flow channel for conducting the exhaust gases comprising $NO_x$ in a given flow direction in the exhaust gas flow channel, the $NO_x$ abatement system comprising a mixing system according to claim 1 and a catalytic converter disposed downstream from the mixing system.

15. The mixing system of claim 7, wherein the heating system is selected from an electrical heating system, a steam heating system, a hot water heating system, a heat transfer fluid heating system or spray evaporator.

16. The mixing system of claim 11, wherein the flow passage has a cross section of 20 to 300 m².

17. The mixing system of claim 11, wherein the flow velocity is between 4 to 12 m/s.

18. The mixing system of claim 1, wherein the flat deflector plates extend continuously along a length of the at least one injection lance.

19. The mixing system of claim 1, wherein the at least one injection lance includes a plurality of the injection points, wherein the flat deflector plates have flat surfaces facing each of the plurality of the injection points.

20. The mixing system of claim 1, wherein the at least one spacer is perpendicular to the at least one of the flat deflector plates.

* * * * *